United States Patent [19]

Watson

[11] 3,850,678

[45] Nov. 26, 1974

[54] PENTACHLOROPHENOL COATED WITH A POLYGLYCOL

[75] Inventor: William David Watson, Midland, Mich.

[73] Assignee: The Dow Chemical Company, Midland, Mich.

[22] Filed: Apr. 2, 1973

[21] Appl. No.: 347,164

[52] U.S. Cl. ............................. 117/100 A, 252/384
[51] Int. Cl. .............................................. B05c 7/14
[58] Field of Search .................. 117/100 A; 252/384

[56] References Cited
UNITED STATES PATENTS

| 2,604,469 | 7/1952 | Herrmann, Jr. | 252/384 |
| 2,944,936 | 7/1970 | Bronson | 252/384 |
| 3,590,101 | 6/1971 | McTaggart et al. | 117/100 A |
| 3,646,225 | 2/1972 | Morrison | 260/247 |
| 3,692,561 | 9/1972 | Hager | 117/100 A |

FOREIGN PATENTS OR APPLICATIONS

| 675,230 | 12/1963 | Canada | 117/100 A |

*Primary Examiner*—William D. Martin
*Assistant Examiner*—Dennis C. Konopacki
*Attorney, Agent, or Firm*—David T. Thurston

[57] ABSTRACT

Free flowing particulate pentachlorophenol having less tendency to bloom is obtained by incorporating about 0.3–1 percent by weight of polyethylene glycol of at least 200 molecular weight or polypropylene glycol of 200–300 molecular weight. Pentachlorophenol prills coated with the polyglycol are a preferred form.

3 Claims, No Drawings

PENTACHLOROPHENOL COATED WITH A POLYGLYCOL

BACKGROUND OF THE INVENTION

This invention relates to a method of treating pentachlorophenol to reduce its tendency to bloom or sublime and to the treated pentachlorophenol thereby obtained.

Pentachlorophenol is a well known fungicide and preservative which is widely used to preserve wood, particularly that which is exposed to the soil or other sources of moisture. Pentachlorophenol is sold in bulk as a granular solid, either flakes or prills. The solid material, particularly when freshly prepared, has a strong tendency to bloom or sublime whereby very fine crystals form on the surface. This coating of crystals is easily dislodged during handling and opening a container can release a cloud of dust which is intensely irritating to eyes, nose, and throat.

Pentachlorophenol has been treated in a number of ways to avoid this problem. The granular material has been tumbled in hot air to make a product having a smooth surface and less tendency to bloom (Canadian Pat. No. 749,423). It has been treated with diethanolamine or triethanolamine to reduce dusting and residual acid (U.S. Pat. No. 3,646,225). Oil treatments have long been used for dusty solids and pentachlorophenol has been given a dual treatment with oil and a glycol to reduce dusting (U.S. Pat. No. 3,692,561). All of these treatments are effective to some degree, but most have economic or other disadvantages. The effect of some is of short duration and blooming may start a few days or weeks after the treatment. Hot air treatment may increase the formation of insoluble sludges upon dissolving the treated pentachlorophenol in a solvent to treat wood. Oil tends to darken the treated pentachlorophenol and it may cause staining or deterioration of the container.

SUMMARY OF THE INVENTION

It has now been found that blooming of solid pentachlorophenol is substantially reduced or eliminated by incorporating in the pentachlorophenol as the sole additive about 0.3–1 percent by weight of at least one polyglycol of the group consisting of polyethylene glycol of at least about 200 average molecular weight and polypropylene glycol of about 200–300 average molecular weight. The treatment is effective in flaked or prilled pentachlorophenol and the granular material remains essentially unchanged in appearance and free flowing even after prolonged storage.

DETAILED DESCRIPTION

The polyglycol can be applied to particulate pentachlorophenol as a coating by spraying a liquid polyglycol or a solution of a solid polyglycol over the solid material. Solid beads or prills can also be tumbled in the presence of a liquid form of the polyglycol to obtain the same result. Alternatively, the polyglycol can be added to molten pentachlorophenol to form a uniform mixture prior to a flaking or prilling operation. Essentially equivalent results are obtained by all of these methods.

Preferably, a polyethylene glycol having an average molecular weight of about 200–20,000 is used as the treating material. Preferred concentrations are in the range of 0.4–0.8 percent. Less than 0.3 percent provides insufficient coating of the pentachlorophenol and some blooming may result while more than one percent of polyglycol tends to make the treated material slightly sticky so that it may cake during storage.

This invention provides a simple and effective procedure using a single inert additive in relatively small amount to eliminate or substantially reduce blooming of pentachlorophenol without significantly altering the appearance and other characteristics of the solid material. The treated solid is more easily handled, it can be stored for extensive periods without any substantial change, it remains free flowing, and its fungicidal and preservative efficiency is essentially undiluted.

EXAMPLES 1–5

Freshly prilled pentachlorophenol was coated with 0.25–1.0 percent by weight of various polyglycols and then stored at room temperature for periodic observation of blooming and agglomeration of the prills. The coating process was accomplished by putting a quantity of the polyglycol in a 500 ml. round bottomed rotating flask held at 60°–80°C until the polyglycol was evenly distributed on the inside surface of the flask. Then about 200 g. of prills was added to the flask and the flask was rotated for an additional 15 minutes at the same temperature to obtain uniform distribution on the prills. The treated prills were put in an 8 oz. bottle for storage. Results of various tests run according to this procedure are listed in Table 1. Blooming ratings were made at 5–7 months of storage according to the following system:

1 — no blooming
2 — slight blooming
3 — blooming same as untreated material
4 — more blooming than untreated material Table 1

| Additive* | Wt. % | Blooming Rating | Agglomeration |
|---|---|---|---|
| E-200 | 0.5 | 2 | no |
| E-400 | 0.1 | 3 | no |
|  | 0.25 | 3 | no |
|  | 0.5 | 2 | no |
|  | 1.0 | 2 | some |
| E-1450 | 0.5 | 1 | no |
| E-20000 | 0.5 | 2 | no |
| P-250 | 0.5 | 2 | no |

*polyethylene and polypropylene glycols of the indicated average molecular weight Other glycols and polyglycols outside the scope of the invention were tested in the same way. The ratings of these materials are listed in Table 2.

Table 2

| Additive | Wt. % | Blooming Rating | Agglomeration |
|---|---|---|---|
| Ethylene glycol | 0.5 | 4 | yes |
| Glycerol | 0.5 | 4 | yes |
| Triethylene glycol | 0.5 | 3 | no |
| Tripropylene glycol | 0.5 | 2 | yes |
| P-400 | 0.5 | 3 | yes |
| P-1200 | 0.5 | 2 | yes |
| P-2000 | 0.5 | 3 | yes |
| B-2000[1] | 0.5 | 4 | yes |
| Polyglycol 15-200[2] | 0.5 | 2 | yes |
| No. 2 Fuel Oil | 0.5 | 4 | no |

[1] polybutylene glycol of 2000 average mol. wt.
[2] a glycerol based polyethylene-polypropylene glycol of about 2600 average mol. wt.

I claim:

1. Free flowing particulate pentachlorophenol consisting essentially of pentachlorophenol and about 0.3 to about one percent by weight of at least one polyglycol of the group consisting of polyethylene glycol of at least about 200 average molecular weight and polypropylene glycol of about 200–300 average molecular weight.

2. The pentachlorophenol of claim 1 wherein the pentachlorophenol is in the form of prills coated with the polyglycol.

3. the pentachlorophenol of claim 2 wherein the polyglycol is polyethylene glycol of about 200–20,000 average molecular weight.

* * * * *